US010621973B1

(12) United States Patent
McVicker et al.

(10) Patent No.: US 10,621,973 B1
(45) Date of Patent: Apr. 14, 2020

(54) SUB-VOCAL SPEECH RECOGNITION APPARATUS AND METHOD

(71) Applicant: Vocasso, Inc., San Francisco, CA (US)

(72) Inventors: Ryan McVicker, San Francisco, CA (US); Brett Eigenbrode, Emeryville, CA (US)

(73) Assignee: Vocasso, Inc., San Francisco, CA (US)

( * ) Notice: Subject to any disclaimer, the term of this patent is extended or adjusted under 35 U.S.C. 154(b) by 107 days.

(21) Appl. No.: 15/928,065

(22) Filed: Mar. 21, 2018

Related U.S. Application Data

(60) Provisional application No. 62/475,491, filed on Mar. 23, 2017.

(51) Int. Cl.
| | |
|---|---|
| *G10L 15/00* | (2013.01) |
| *G10L 15/02* | (2006.01) |
| *G10L 15/18* | (2013.01) |
| *G10L 15/16* | (2006.01) |

(Continued)

(52) U.S. Cl.
CPC ............ *G10L 15/02* (2013.01); *G10L 15/16* (2013.01); *G10L 15/18* (2013.01); *G10L 19/038* (2013.01); *H04R 1/1091* (2013.01); *G10L 2015/025* (2013.01)

(58) Field of Classification Search
CPC ... G10L 15/25; G10L 15/24; G10L 2015/225; G10L 15/16; A61B 5/682; H04R 1/46; H04R 1/14; H04R 2460/13; H04R 2201/107
See application file for complete search history.

(56) References Cited

U.S. PATENT DOCUMENTS

| | | | | |
|---|---|---|---|---|
| 4,486,630 A | * | 12/1984 | Fetchko | ................... H01H 3/14 200/52 R |
| 8,200,486 B1 | * | 6/2012 | Jorgensen | ............... G10L 15/24 704/231 |

(Continued)

OTHER PUBLICATIONS

Jorgensen, Chuck, and Kim Binsted. "Web browser control using EMG based sub vocal speech recognition." Proceedings of the 38th Annual Hawaii International Conference on System Sciences. IEEE, 2005. (Year: 2005).*

(Continued)

*Primary Examiner* — Edgar X Guerra-Erazo
(74) *Attorney, Agent, or Firm* — Staniford Tomita LLP

(57) ABSTRACT

A sub-vocal speech recognition (SVSR) apparatus includes a headset that is worn over an ear and electromyography (EMG) electrodes and an Inertial Measurement Unit (IMU) in contact with a user's skin in a position over the neck, under the chin and behind the ear. When a user speaks or mouths words, the EMG and IMU signals are recorded by sensors and amplified and filtered, before being divided in multi-millisecond time windows. These time windows are then transmitted to the interface computing device for Mel Frequency Cepstral Coefficients (MFCC) conversion into aggregated vector representation (AVR). The AVR is the input to the SVSR system, which utilizes a neural network, CTC function, and language model to classify the phoneme. The phonemes are then combined into words and sent back to the interface computing device, where they are played either as audible output, such as from a speaker, or non-audible output, such as text.

16 Claims, 9 Drawing Sheets

(51) Int. Cl.
*H04R 1/10* (2006.01)
*G10L 19/038* (2013.01)

(56) References Cited

U.S. PATENT DOCUMENTS

| | | | |
|---|---|---|---|
| 8,836,638 B2* | 9/2014 | Madhvanath | G10L 15/24 |
| | | | 345/156 |
| 2005/0101875 A1* | 5/2005 | Semler | A61B 5/04085 |
| | | | 600/509 |
| 2008/0103769 A1* | 5/2008 | Schultz | G10L 15/24 |
| | | | 704/235 |
| 2010/0185115 A1* | 7/2010 | Causevic | A61B 5/0482 |
| | | | 600/544 |
| 2016/0314781 A1* | 10/2016 | Schultz | G10L 13/04 |

OTHER PUBLICATIONS

Denby, Bruce, et al. "Silent speech interfaces." Speech Communication 52.4 (2010): 270-287. (Year: 2010).*

* cited by examiner

SUB-VOCAL SPEECH RECOGNITION APPARATUS AND METHOD

CROSS REFERENCE TO RELATED APPLICATIONS

This application claims priority to U.S. Provisional Patent Application No. 62/475,491, "Sub-Vocal Speech Recognition Apparatus And Method" filed Mar. 23, 2017, which is hereby incorporated by reference it its entirety.

BACKGROUND

Some people are speech impaired due to a medical reason such as having a degenerative muscle disease, stroke or laryngectomy procedure. For example, those who have suffered a stroke, may have also lost their ability to form words and sounds. One device used to assist the voicebox is the electrolarynx, sometimes referred to as a "throat back" which is a medical device about the size of a small electric razor used to produce clearer speech. The most common electrolarynx device is a handheld, battery-operated device placed under the mandible, which produces vibrations to allow speech. However, there are many drawbacks to the electrolarynx. The device requires vibration in order to the sound. Thus, a person who cannot create a vibration cannot use the electrolarynx. What is needed is an improved system that collects and identifies a user's intended speech and conveys that information to one or more electronic devices in lieu of an audible alternative, which can be used by people a wider range of people who have are speech impaired including those who cannot use an electrolarynx.

SUMMARY OF THE INVENTION

The present invention is directed towards a sub-vocal speech acquisition device (SVSA) that includes sensors placed on the head of the system user that allows the user to convey information to their digital device without speaking out loud or using their hands. The user can mouth words without making a sound, and signals from the sensors can be used to output signals, which are processed to identify the user's intended words. The intended word data can be translated using commercial translation software into audio signals, which would then be played audibly from the user's chosen interface computing device and output as audible speech.

The present invention is a system that acquires, analyzes and processes sub-vocal signals so that a representation of speech, be it normal or otherwise, can be provided. The system relies on a number of sensors that measure the electrical output of the muscles and the jaw position to analyze the signals associated with speech production. Electromyography (EMG) sensors measure electrical activity in response to nerve stimulation of the muscles. In one embodiment, EMG signals are measured by an electrode pair around the user's neck, an electrode pair behind the ear, and an electrode pair plus Inertial Measurement Unit (IMU) mounted under the chin. The IMU may contain accelerometers, gyroscopes, or magnetometers. While conventional speech relies on the muscles to move in repeatable ways and speech to be understood by others, the SVSA device will handle variation in a user's movements and are indifferent to whether normal or audible speech can be understood by others.

The signals obtained by the EMG sensors may then be amplified and filtered during hardware signal processing before being sent through the sub-vocal speech recognition (SVSR) system to classify the speech of the user. The EMG signals are amplified and filtered by the processing board to better isolate data associated with speech patterns. After the hardware signal processing is complete, the data is transferred to the microprocessor where it is digitized using an analog-to-digital converter. The digitized signal from each EMG sensor is then divided into multi-millisecond windows of EMG data. In one embodiment, the window size is non-sliding and in consistent window sizes. In another embodiment, the time window is multiple sliding windows of differing lengths, where it advances 1 ms to form more windows, which are then processed before the sliding windows advance another 1 ms forward.

For all window sizes, data is converted into Mel Frequency Cepstral Coefficients (MFCC) by MFCC conversion. This MFCC conversion is performed on each window of data, represented by vector representation. A Mel frequency coefficient is a representation of the short-term power spectrum of a signal, based on a linear cosine transform of a log power spectrum on a nonlinear Mel scale of frequency.

The IMU calculates position data of the IMU itself to determine IMU movement during the same time windows that the EMG sensor data is collected and processed. The EMG vector representations from the microprocessor and the IMU vector representation are aggregated before it is input into the SVSR system.

The aggregated vector representation (referred to in this document as AVR) is then sent through the SVSR system where the user's intended elements of speech, in the form of a phoneme, are identified. A phoneme can be a perceptually distinct unit of sound, which helps distinguish one word from other. Phonemes are conventionally placed between two forward-slashes "/". Examples of the phonemes that make up the word "hat" are /h/, /a/, and /t/. While an exact number of phonemes for English has not been determined, an acceptable range of phonemes for most English words is usually 40+/−10.

The SVSR system includes a neural network, a Connectionist Temporal Classification (CTC) function, and a language model. The neural network classifies each AVR as a phoneme for each time window. The CTC function adds context by analyzing the sequence of phonemes and removing duplicates and excess phonemes. The language model adds more context by generating probabilities of each phoneme with respect to the sequence of phonemes already identified, ultimately classifying an entire word as the system output. The system output, or word in one embodiment of the invention, is sent to the interfae computing device and played, either in audible form, such as from a speaker or other device, or in a non-audible form, such as text on a smartphone, visual display or other device.

DRAWING DESCRIPTION

FIG. 1 is a front view of an embodiment of a headset.
FIG. 2 is a left-side view of the headset.
FIG. 3 is a close-up of the top-down view of the headset.
FIG. 4 is a view of the headset removed from the user.
FIG. 5 is an embodiment of a block diagram of the full system.
FIG. 6 is an embodiment of a data processing flowchart for the full system.
FIG. 7 is a block diagram representation of the sensor signal processing components.

DETAILED DESCRIPTION

Figure 1:
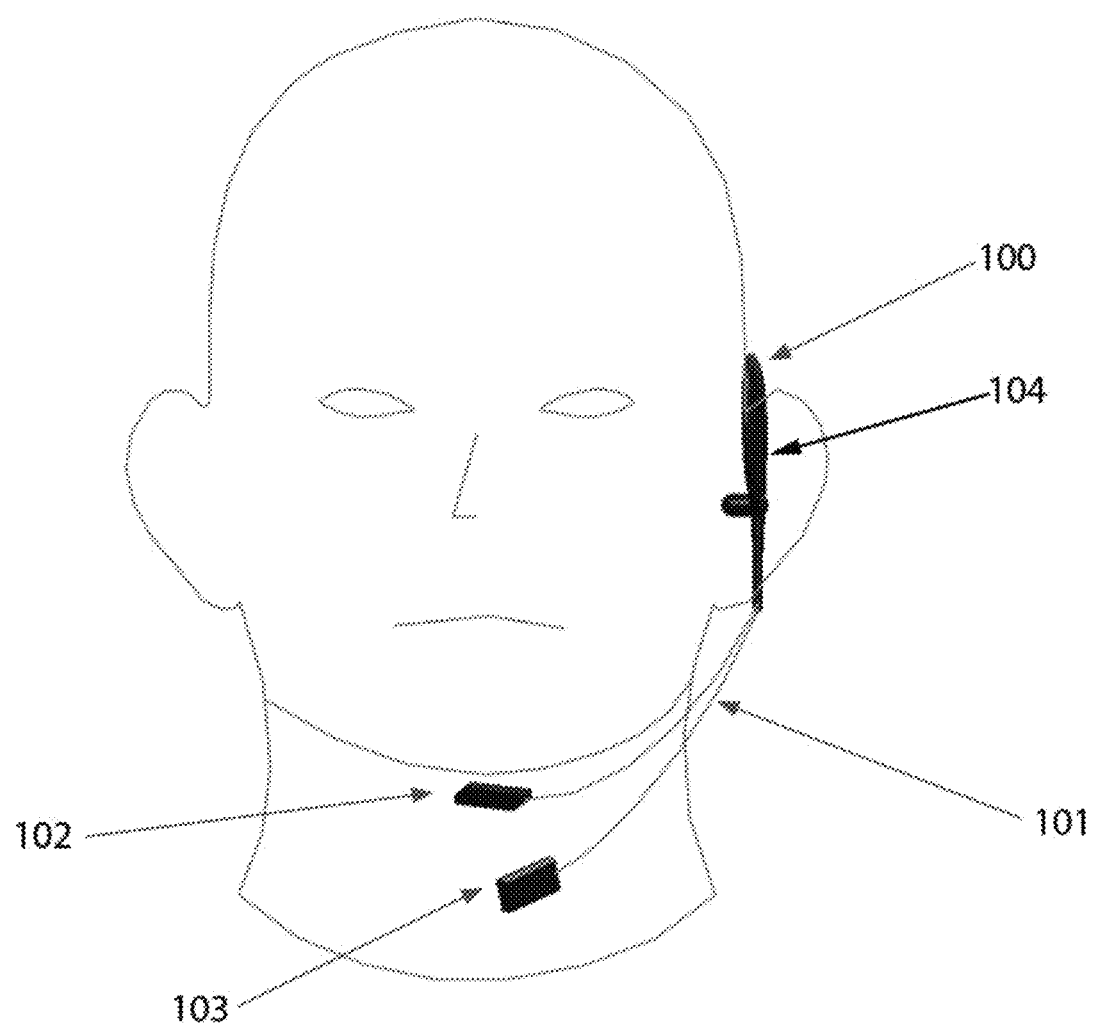

A sub-vocal speech recognition apparatus is shown in FIG. 1. The apparatus includes a headset that is worn over an ear with electromyography (EMG) electrode pairs in contact with a user's skin in a position near the neck and behind the ear, with an EMG pair plus IMU also under the chin. The EMG electrodes measure muscle electrical activity in response to a nerve's stimulation of the muscle.

FIG. 1 is a front view of the headset 100 constructed in accordance with one embodiment. The upper portion of the headset 100 sits over the user's ear in a conventional manner. The headset 100 can be worn over the ear with the bend and stay wires 101 extending out of the headset 100. The chin EMG electrode pair and IMU 102 can be positioned on a surface of the user's face under the user's chin. The neck EMG electrode pair 103 can be positioned on a surface of the user's neck, and an upper EMG pair can be placed on a surface of the user's head behind the ear 104. A housing for the chin EMG electrode pair and IMU 102 and a housing for the neck EMG electrode pair 103 can be connected to the headset 100 via bend and stay wires 101 that can also include electrical conductors that conduct electricity and transmit digital information from the chin EMG electrode pair and IMU 102 and the neck EMG electrode pair 103 to the headset 100. In an embodiment, the chin electrode pair and the IMU 102 are mounted in the same housing. In other embodiments, the chin electrode pair and the IMU can be mounted in separate housings that are in communication with the headset 100. The stay wires can apply a force, which presses the EMG electrodes against the user's face to hold them in place. A third EMG electrode pair 104 contacts behind the user's ear as the ground reference and can be mounted to an exterior surface of the headset 100 housing.

The headset 100 shown in FIG. 1 is worn in a manner that is similar to other ear piece devices over the ear. The user can position the headset 100 so the upper electrodes are in contact with the skin on the skull of the user. The bend and stay wires 101 can be positioned until the chin electrode pair and the IMU 102 is in firm contact with the skin just below and behind the apex of the user's chin. The neck EMG electrode 103 is similarly placed in the firm contact with the area of the neck close to the larynx by adjusting the end and stay wires 101. Electromyography is an electrodiagnostic medicine technique for evaluating and recording the electrical activity produced by skeletal muscles. The EMG electrodes can be used to detect the electrical activity of the facial muscles.

Figure 2:
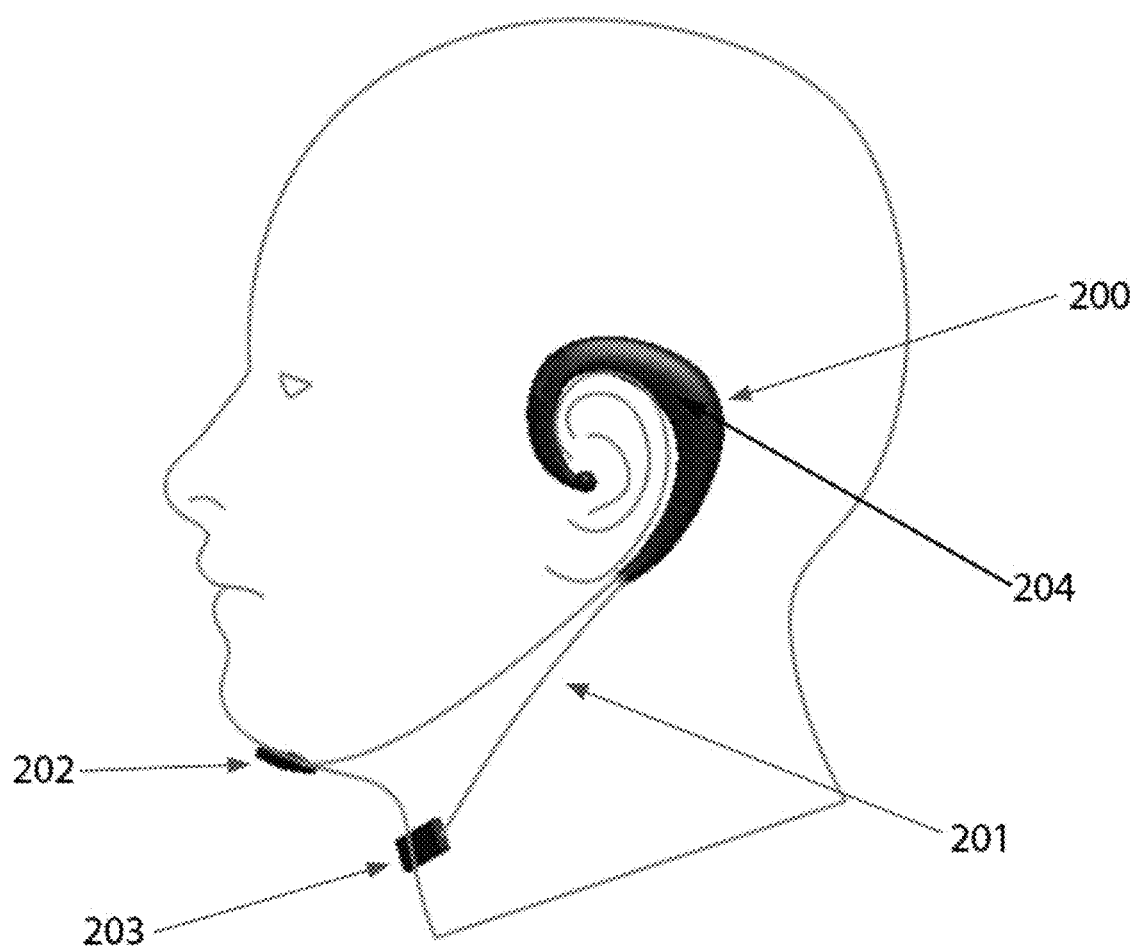

FIG. 2 is a profile view of the left side of the user's head wearing the headset being worn in the same configuration as in FIG. 1. The headset 200, wrapped around the ear, with bend and stay wires 201 connecting to the chin electrode pair and the IMU 202 and the neck EMG pair 203, with the third EMG pair mounted behind the ear 204. The upper portion of the headset 200 sits over the user's ear. The chin electrode pair and the IMU 202 and the neck EMG electrodes 203 are also in contact with the user's skin and connected to the upper portion 200 of the headset via bend and stay wires 201. In an embodiment, the stay wires can be bendable structures that can be bent so that the chin electrode pair and the IMU 202 and the neck EMG electrodes 203 are securely positioned on the user's desired locations. The chin EMG electrode can detect chin movement, and the electrical output, of the muscles, including but not limited to, in and around the chin, the neck, and the face. The neck EMG electrodes 203 can detect muscle movement, and the electrical output, of muscles, including but not limited to, in, around and down the neck, as well as the tongue. The front end of the upper portion of the headset 200 can extend around the front of the ear and into the ear canal for audible speech to be heard from the earpiece by the user. A third EMG electrode 204 contacts behind the user's ear as the ground reference.

In an embodiment, the wires 201 can provide pressure on the chin electrode pair and the IMU 202 and the neck EMG electrodes 203 against the skin of the user. The pressure can be sufficient to hold the chin electrode pair and the IMU 202 and the neck EMG electrodes 203 in place during normal facial movement but not so high that the contact become an irritation. The EMG electrodes pressure against the skin may be between 0.1 PSI to 2 PSI. In some embodiments, a conductor gel can be placed between the EMG electrodes pressure the skin. In other embodiments, the wires 201 do not provide any pressure on the chin electrode pair and the IMU 202 and the neck EMG electrodes 203 against the skin of the user. In these embodiments, the chin electrode pair and the IMU 202 and the neck EMG electrodes 203 can be attached to the skin of the user with an adhesive that may also function as a conductor for proper electrical contact with the user's skin.

Figure 3:
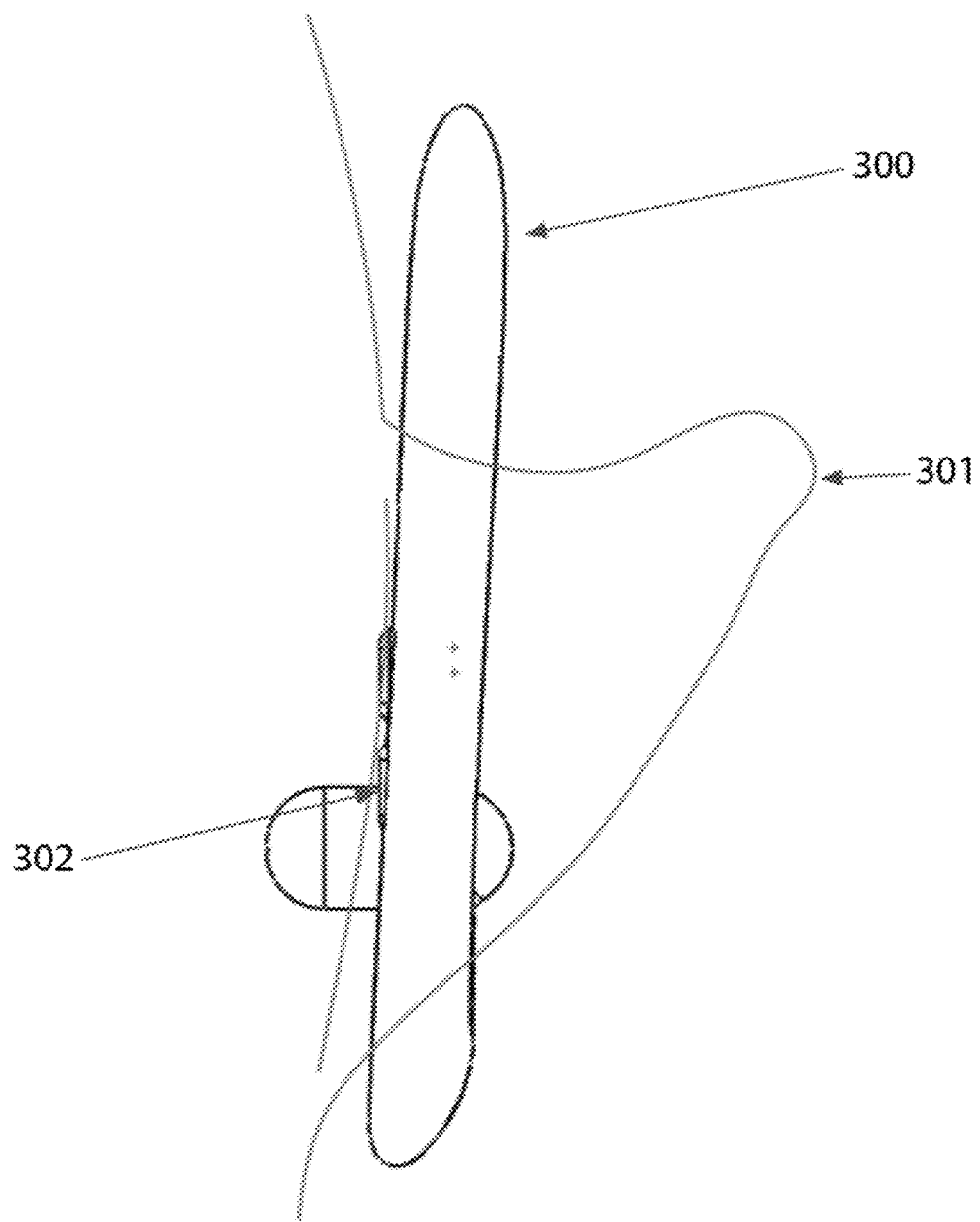

FIG. 3 is a top view of the headset 300 mounted over the user's ear 301. The upper portion of the headset can be positioned between the upper ear and the skull where the upper EMG electrode pair 302 are in contact with the skin behind the ear, directly adjacent to the skull, as the ground reference. To improve the EMG readings on the chin and neck of the user, a reference point must be used. FIG. 3 shows the reference point, which is a pair of EMG electrodes mounted behind the ear 302. This EMG electrode pair 302 is used as a ground reference for the filters so that the body's natural electricity can be negated, so only the muscle groups near the chin electrode pair and the neck electrode pair are measured. The headset 300 may also have an earpiece which can have a speaker, which can be positioned adjacent to or partially within the ear canal.

Figure 4:
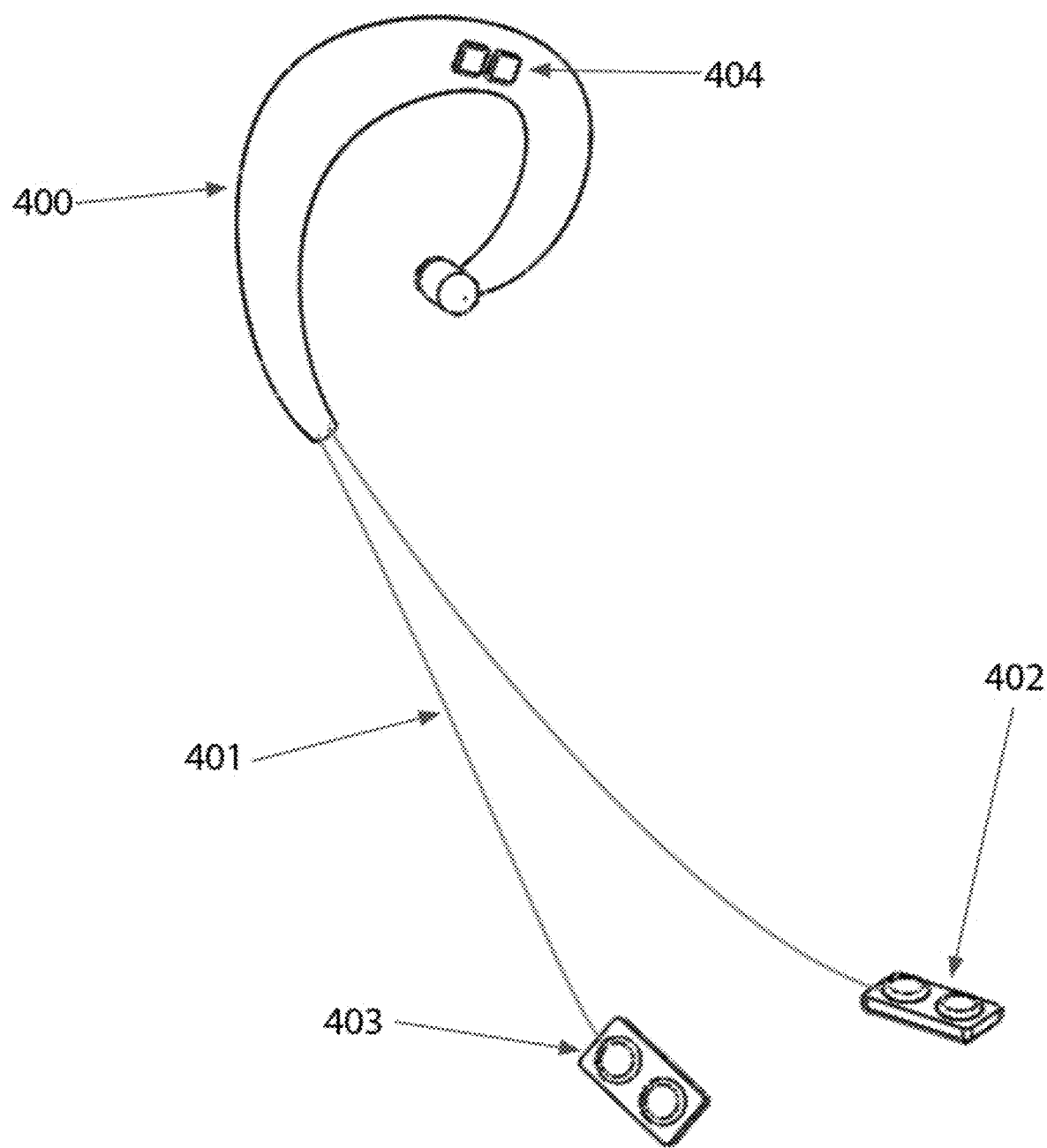

FIG. 4 is a perspective view of the headset 400 being mounted on the user. The headset compromises the upper section 400 that also is the mounting position for the upper EMG electrodes that mount behind the ear 404. The bend and stay wires 401 lead to both the chin electrode pair and the IMU 402 and the neck EMG electrode 403, holding these in place. In other embodiments, any other coupling can be used to hold the electrodes in place including adhesives. The bend and stay wires are flexible wires with adhesive on the chin electrode pair and the IMU 402 and the neck electrodes 403. The EMG electrode, in one embodiment, can be Biopac model EL 120 dry electrodes and the IMU can be the SparkFun 9DoF IMU. In other embodiments, any other suitable type of sensor or electrode can be used. These specific EMG electrodes read analog signals in the 25 to 100 mV range and can, in one embodiment, be connected to the signal processing hardware via Biopac model LEAD 120 wire leads. In other embodiments, alternative wire leads can be used to transfer signals to the signal processing hardware. In one embodiment the IMU is a motion-sensing system-in-a-chip, housing a 3-axis accelerometer, 3-axis gyroscope, and 3-axis magnetometer for nine degrees of freedom (9DOF) in a single IC.

Figure 5:
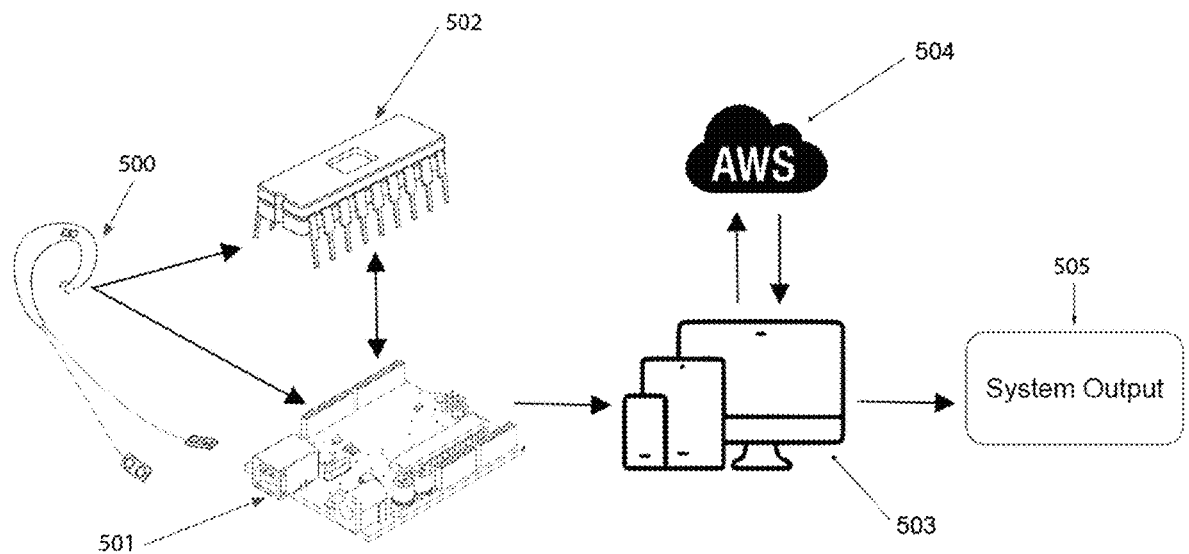

FIG. 5 is a representation of the full system from the headset 500, to the hardware signal processing board 501 and microcontroller 502, to the interface computing device 503, and the cloud computing platform 504. The hardware processing board 502 combines the ground reference into the EMG sensor neck and chin inputs. The design of the amplifiers and the filters on the hardware processing board 502 are configured to filter the frequencies being measured to those relevant to the range of human muscle movement and speech production. In an embodiment, the frequency of speech production can be filtered to be within the frequency range of 0 Hz to 1,000 Hz.

The hardware processing board, in one embodiment, may be the Olimex EMG Shield-EKG-EMG, which conducts the filtering, amplification, and the ground reference activities. In one embodiment, all phoneme recognition can be performed on the interface computing device 503, while other embodiments may need to use additional computation resources in the cloud 504 for phoneme recognition.

In one embodiment, the sensor data collected from the EMG electrodes and IMU sensor in the headset can be processed through different methods. For example with reference to FIG. 1, when properly mounted on the user, the EMG electrodes 102, 103, 104 coupled to the headset 100 are in positions to pick up the electrical signals of the muscles used when a person is speaking or simulating speech. When the user starts speaking, like in the example saying the word 'hello', the headset monitors the EMG signals from the chin EMG electrode 102 and the neck electrode 103 and the IMU mounted in the chin electrode housing. These EMG signals are amplified and filtered by a hardware signal processing board, which is shown in FIG. 5. This board 501 and the microcontroller 502 are connected to the headset by either a wired or wireless connection. These EMG signals may be amplified and/or noise filtered. In another embodiment, the filters may include low-pass and/or notch filters, where frequencies ranging from 0 Hz to 1,000 Hz may be passed, with frequencies exceeding the upper bound (over 1,000 Hz) can be filtered out of the EMG signals. The amplification and filtering typically correspond to the frequencies relevant to the range of speech production. After the hardware EMG signal processing is complete, the EMG processed data is transferred to the microprocessor where it is digitized using an analog-to-digital (A2D) converter. The A2D converter may convert at a rate, from a range of 4-bit to 64-bit.

While the system is processing the EMG signals, the system can simultaneously process the IMU signals. The IMU in the headset may perform initial position and orientation calculations onboard. These calculations are then sent to a microcontroller 502, in this example the microcontroller is a Teensyduino, but can any number of other microcontrollers, including but not limited to an Arduino ZERO. The EMG signals may be collected at a frequency ranging from 10 Hz up to 20,000 Hz. Compression may be used to minimize the amount of data to be transferred to the SVSR system while retaining the signal characteristics sufficient for accurate interpretation. The microprocessor, having digitized the EMG data, transfers the EMG and IMU data to the interfae computing device. These vector representations are aggregated as aggregated vector representations (AVR) and sent to the interface computing device 503, which may be a smartphone, other mobile or portable device, or a stationary device such as a desktop PC. Computing may take place directly on the interface computing device 503. Alternatively, the data may be transmitted from the interface computing device 503 to the cloud computing platform 504, where the computing may take place. The cloud computing platform 504 can classify the words based upon the EMG and IMU data. The cloud computing platform 504 can then transmit the words back to the interface computing device 503. The interface computing device 503 can play the words itself through an integrated speaker or another app, or transmit the words to the system output 505. If the system output 505 is an audio device such as a speaker, ear buds, headphones, or other audio device, the words can be played through the system output 505. If the system output 505 is a visual display, the interface computing device 503 can output the words in a non-audible form which can be displayed as text.

With reference to FIG. 1, when properly mounted on the user, the EMG electrodes 102, 103, 104 coupled to the headset 100 are in positions to pick up the electrical signals of the muscles used when a person is speaking or simulating speech. When the user starts speaking, like in the example saying the word 'hello', the headset monitors the EMG signals from the chin and neck electrodes and the IMU mounted in the chin electrode housing. The EMG signals are amplified and filtered by a hardware signal processing board as shown is shown in FIG. 5. This board 501 and the microcontroller 502 are connected to the headset by either a wired or wireless connection.

Figure 6:
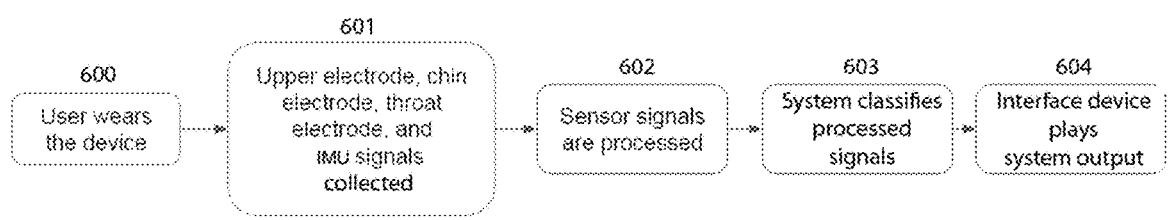

FIG. 6 is a block diagram representation of how the system operates during normal use. As discussed above, the user wears the full headset with chin electrode pair and the IMU and the neck EMG electrode 600. During operation, the sensor data from the chin electrode pair, the IMU and the neck EMG electrode is collected 601. The raw data from the chin electrode pair, the IMU and the neck EMG electrode is then processed, including filtering schemes and signal amplification. The processed data is then translated into AVRs 602. The AVRs are then classified by the SVSR system 603 to determine the detected word. The detected word is then output by the system to a system output 604 where the word can be output and played by the interface computing device.

Figure 7:
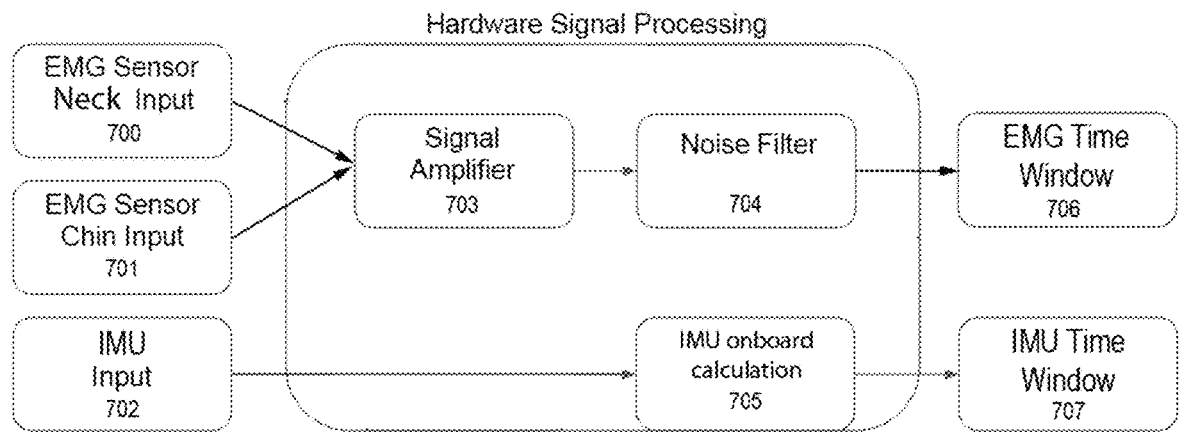

FIG. 7 is a block model representation of how the EMG and IMU data is translated into discrete time windows that can be processed to detect words. The EMG sensor data is acquired from the EMG Sensor Neck Input 700 and EMG Sensor Chin Input 701. The EMG sensor data is amplified 703, noise filtered 704 to remove noise. The amplified and filtered EMG signals are then broken into time windows 706 prior to analysis. The IMU sensors 702 collect data relating to the inertial movements of the chin module. The IMU utilizes its own microcontroller to translate these raw sensory signals into more meaningful information 705, such as the position and orientation of the IMU device. The position and orientation information that is utilized in this embodiment are the standard outputs used by professionals in the field. The output of the IMU is also windowed 707 over the same time period as the EMG data. These data windows typically would correspond to several milliseconds worth of EMG and IMU data that have been collected by the sensors. Data windows may be completely disjoint, or may overlap with the last data from a prior data window may be repeated as the first data in the next subsequent data window.

Figure 8:
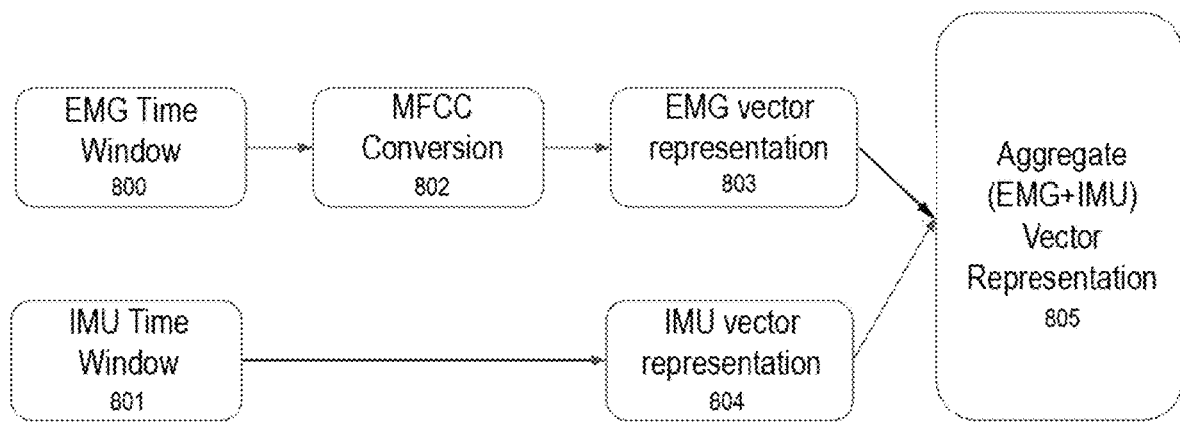
FIG. 8 is a block diagram of representation of the EMG data time window processing.

FIG. 8 is a block diagram that shows how the EMG and IMU windowed data is translated into a single vector representation, known as the aggregate vector representation (AVR). The EMG time window data 800 first undergoes a Mel Frequency Cepstral Coefficients (MFCC) conversion 802 to create an EMG vector representation for the time window 803. In an embodiment, the MFCC conversion can function to extract an EMG vector representation containing all information about the linguistic message. The MFCC conversion can mimic some parts of the human speech production and speech perception. MFCC conversion can mimic the logarithmic perception of loudness and pitch of human auditory system and can attempt to eliminate speaker dependent characteristics by excluding the fundamental frequency and their harmonics. To represent the dynamic nature of speech the MFCC also includes the change of the EMG vector representation over time. The IMU time window data 801 is also translated into an IMU vector representation 804. These two independent vector representations (EMG vector representation 803 and IMU vector representation 804) are then combined into the AVR 805.

Figure 9:
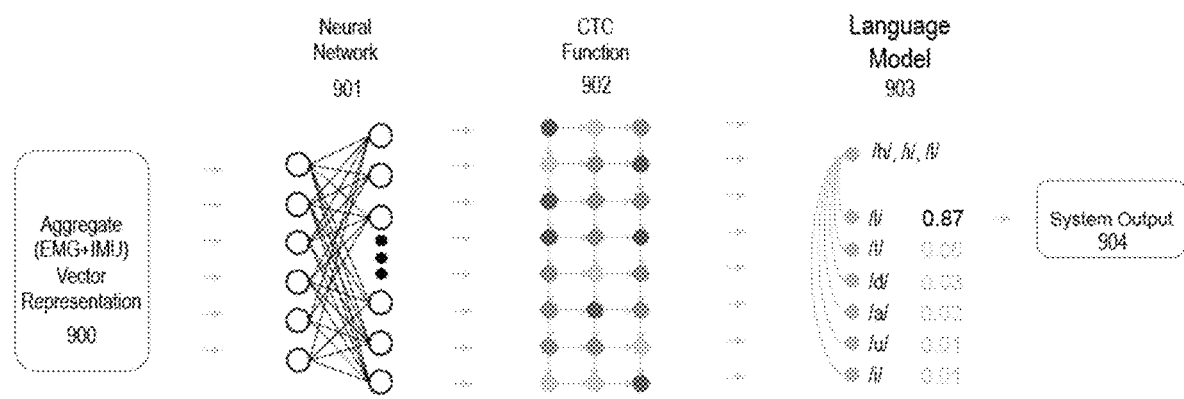
FIG. 9 is a block diagram representation of the SVSR system.

FIG. 9 shows the block diagram how each AVR representation of the EMG and IMU AVR data 900 is translated into an actual system output 904. Each time window generates an AVR 900 of the preprocessed EMG and IMU sensor data for a time window. The AVR is then used as an input layer to a neural network 901 which classifies phonemes. Next, a Connectionist Temporal Classification (CTC Function) 902 removes redundant phonemes, and a language model 903 uses past and future phoneme classifications to determine the current classified phoneme.

The neural network 901 can be trained to classify each of the phonemes of the English language (or any other language), and may use zero or more hidden layers, with each node of the output layer corresponding to one of the phonemes of the English language, such as the earlier examples of /h/, /a/, and /t/. Additional phonemes may be created to represent silence and other audible non-speech such as coughs and sneezes. The neural network must be trained on a training set of aggregated vector representations, where each AVR in the training set has an associated phoneme label. In one embodiment, the neural network may be a Convolutional Neural Network (CNN). Alternative embodiments may use other types of neural networks or machine learning algorithms, including but not limited to Recurrent Neural Networks (RNN), Deep Neural Networks (DNN), or Multi-Layered Perceptrons (MLP). The neural network may be trained using one of any number of neural network training algorithms, such as Back-Propagation or Gradient Descent.

While the output from the neural network 901 is the phoneme with the highest probability associated with the signal data from that time window, it is possible that a phoneme is repeated over two or more windows, even though only one phoneme is present. That is, a single phoneme may be longer in duration than what can be captured by a single time window AVR. To handle these repetitions, a Connectionist Temporal Classification (CTC) loss function 902 is used to add context to the sequence of phonemes. Handling removal of the excess phonemes is called dynamic time warping. For example, the word "hi" could be produced from three time windows and result in combinations such as "hii", "hhi", "hi_", "_hi", or "h_i". CTC would remove the extra /h/ in "hhi", so that instead of two /h/ phonemes, only a single /h/ is passed along to the language model. A CTC loss function is a known and widely used algorithm for performing speech recognition on audio data collected on standard microphones but works also in the described system because the EMG and IMU data is being classified into phonemes, which is often a key step in typical speech recognition solutions.

Once the CTC 902 has removed the excess phonemes, a language model 903 will determine the probability of the current phoneme with respect to the phonemes that have been identified. The language model used in one embodiment is a standard probabilistic language model known and widely used in the art of standard speech recognition models and solutions. Continuing the earlier example of the word "hi", the phonemes identified from CTC were /h/ and /i/ (the long "i" phoneme having a line on the top). The word could be "hi" or it could be the beginning of a longer word, such as "hill". What the language model will do is determine the probability p(l|h, i). If the CTC identifies another phoneme /l/ from the next time window, then the language model will determine the probability p(l|h, i, l) and output the phoneme with the highest probability. To continue this example with "hill", if the next phoneme were identified as /o/, then it is most likely to be the beginning of another word. Having moved onto the next word from the /o/, the word "hill" would be the system output 904 and sent to the user's interface computing device.

Figure 10:
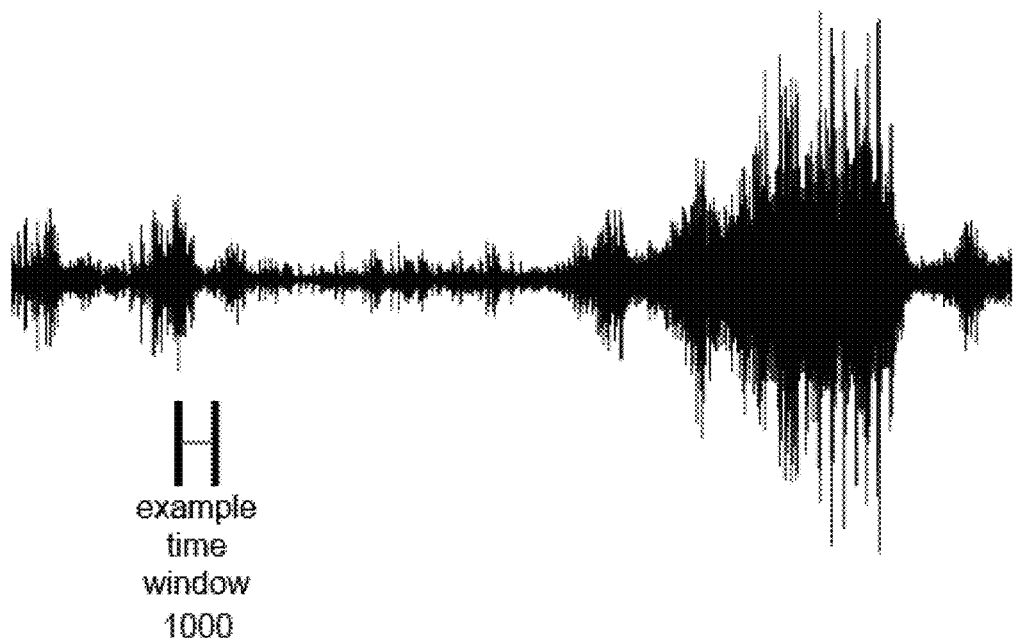
FIG. 10 is an example of the signal collected from an EMG sensor of the user is saying 'hello' in a time window.

FIG. 10 is a waveform representation of the EMG sensor input that occurs when the user says the word 'hello'. An example of a time window 1000 is shown where the horizontal axis is time and the vertical axis is the amplitude of the EMG sensor signal.

Figure 11:
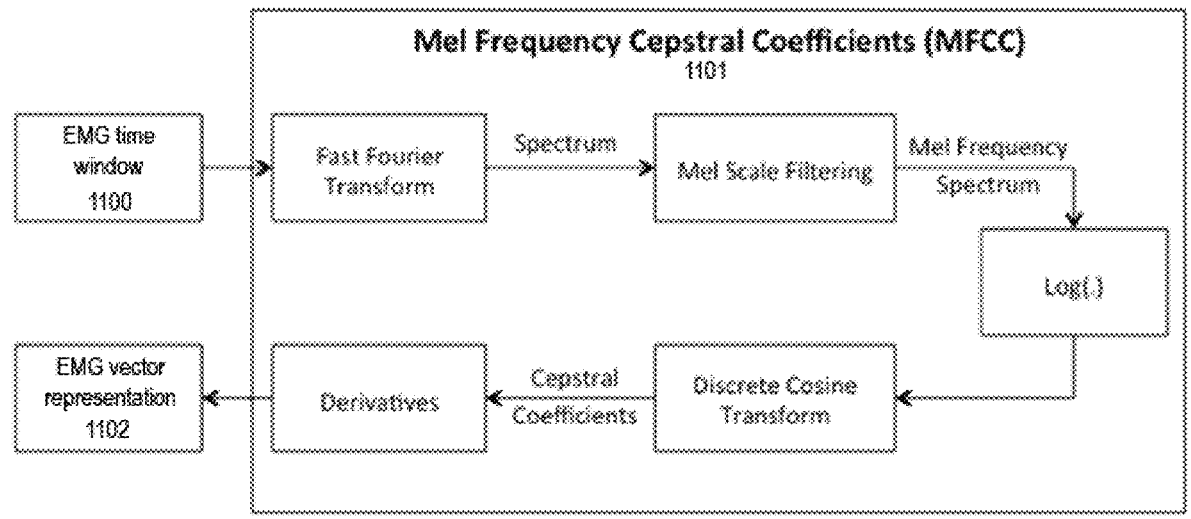
FIG. 11 is a flowchart of MFCC conversion and the resulting vector representations.

A representation of the processed signal that is collected from the EMG sensors can be seen in FIG. 11, which is an example of the EMG time window 1100 data going through MFCC conversion 1101. The time window data is converted from the time domain to the frequency domain and grouped into Mel frequency buckets. The processed signal is then divided into time windows, such as the example time window 1100. The time window 1100 can be any suitable duration of time that still allows accurate determination of the phonemes or phoneme classifiers. In one embodiment, the data is chunked into windows of 20 ms, with non-overlapping windows, such that the end of one window is the beginning of the next. The relative proportion of the input signal that falls into each frequency bucket can be represented by a vector 1202 instead of the raw signal itself. For example, if the signal data from a time window is separated into 10 Mel frequency domains, a vector represents the intensity of the signals across each of those 10 Mel frequency buckets.

Figure 12:
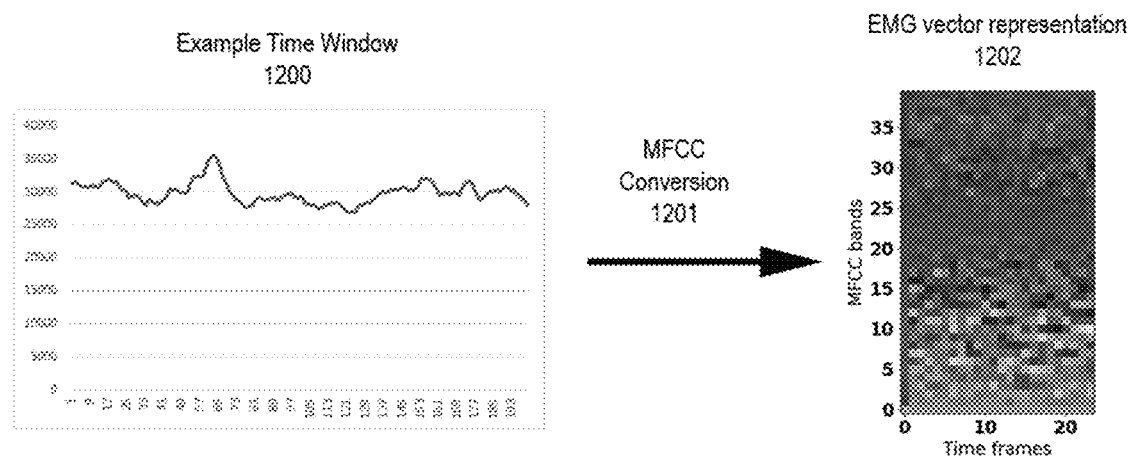
FIG. 12 illustrates an example of a time window that is charted and then converted into the AVR.

FIG. 12 displays the example time window 1200 that is charted and then converted 1201 into the AVR. The raw EMG sensor data is recorded as the example time window 1200 and can be quite complex. In order to target generalizability, preprocessing methods and feature extraction are employed. To extract the signal features from this data, MFCC conversion 1201 is performed on each time window 1300 of data and the amplitude of each frequency band, which is transformed into an EMG vector representation 1302. The EMG vector representation 1202 can then is combined with a vector representation of the IMU data to create the AVR.

The example time window 1200 represents a digitized signal before MFCC conversion where The X axis represents the time scale, and are numbered samples collected at 4,000 Hz, so that each sample is 1/4,000 of a second in length. The Y axis represents the signal voltage recorded by each numbered sample using a 16-bit rate and represents integers 0 to 65,536 Hz. The MFCC conversion 1201 can be substantially the same as the MFCC process described in FIG. 11. The output of the MFCC conversion 1201 can be represented as a heat map where the X axis represents the number of time frames and the Y axis represents the MFCC bands.

With reference to FIG. 8, The EMG vector representation 803 can be combined with the IMU vector representation 804 to create an AVR 805. The AVR is then classified by the SVSR system into phonemes. Detected or classified phonemes are further combined and classified into detected words. The detected words are then passed to an interface computing device which can play them in an audible form or display them in text form on an audio system output device.

While the SVSA has been described for use in normal ambient conditions, in other embodiments, the SVSA apparatus could be used for various other applications in abnormal ambient conditions. For example, in an embodiment the SVSA apparatus can be used as a silent input translation device. Circumstances exist where a user might want to communicate with a computer, digital device, or another person in a covert or silent manner that would make audible speech undesirable. In other situations the SVSA user may be in an environment that has significant ambient noise such as an industrial site or on an active battlefield, the SVSA apparatus can be used for communications because it does not rely on audible sound to convey speech. In other embodiments, the SVSA apparatus can be used hazardous environments that require a person to wear protective gear that covers the mouth, such as a self-contained underwater breathing apparatus or other safety equipment in situations that can otherwise impair the ability of the user to communicate with conventional audible speech. In other embodiments, the SVSA apparatus can be used in various other environments where normal audible speech is difficult or impossible.

Figure 13:
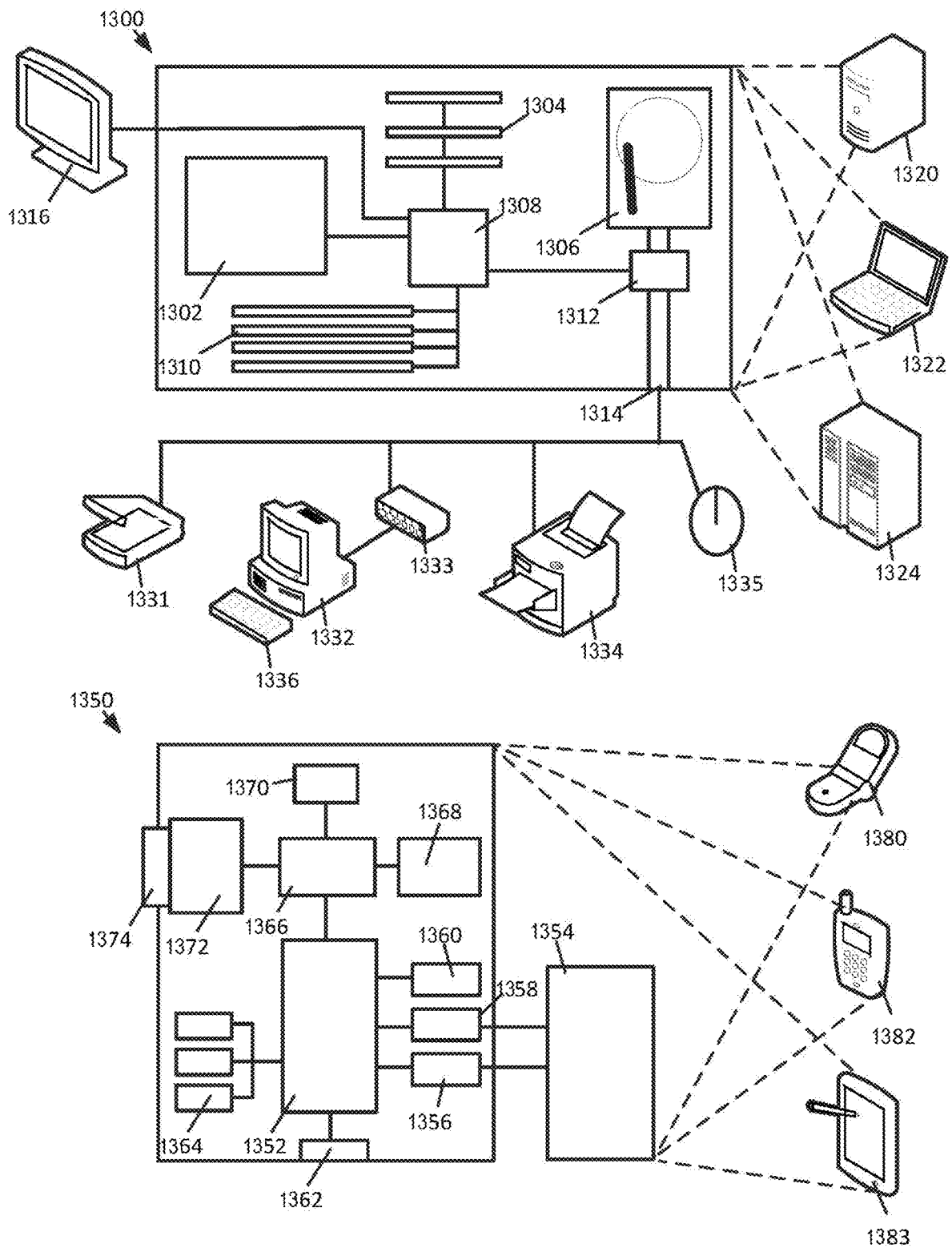
FIG. 13 illustrates an example of computer devices.

FIG. 13 shows an example of a generic computer device 1300 and a generic mobile computer device 1350, which may be used to implement the processes described herein, including the mobile-side and server-side processes for installing a computer program from a mobile device to a computer. Computing device 1300 is intended to represent various forms of digital computers, such as laptops, desktops, workstations, personal digital assistants, servers, blade servers, mainframes, and other appropriate computers. Computing device 1350 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 1300 includes a processor 1302, memory 1304, a storage device 1306, a high-speed interface 1308 connecting to memory 1304 and high-speed expansion ports 1310, and a low speed interface 1312 connecting to low speed bus 1314 and storage device 1306. Each of the components processor 1302, memory 1304, storage device 1306, high-speed interface 1308, high-speed expansion ports 1310, and low speed interface 1312 are interconnected using various busses and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as display 1316 coupled to high speed interface 1308. In other implementations, multiple processors and/or multiple busses may be used, as appropriate, along with multiple memories and types of memory. Also, multiple computing devices 1300 may be connected, with each device providing portions of the necessary operations (e.g., as a server bank, a group of blade servers, or a multi-processor system).

The memory 1304 stores information within the computing device 1300. In one implementation, the memory 1304 is a volatile memory unit or units. In another implementation, the memory 1304 is a non-volatile memory unit or units. The memory 1304 may also be another form of computer-readable medium, such as a magnetic or optical disk.

The storage device 1306 is capable of providing mass storage for the computing device 1300. In one implementation, the storage device 1306 may be or contain a computer-readable medium, such as a floppy disk device, a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 1304, the storage device 1306, or memory on processor 1302.

The high-speed controller 1308 manages bandwidth-intensive operations for the computing device 1300, while the low speed controller 1312 manages lower bandwidth-intensive operations. Such allocation of functions is exemplary only. In one implementation, the high-speed controller 1308 is coupled to memory 1304, display 1316 (e.g., through a graphics processor or accelerator), and to high-speed expansion ports 1310, which may accept various expansion cards (not shown). In the implementation, low-speed controller 1312 is coupled to storage device 1306 and low-speed expansion port 1314. The low-speed expansion port 1314, which may include various communication ports (e.g., USB, Bluetooth, Ethernet, wireless Ethernet), may be coupled to one or more input/output devices, such as a keyboard 1336 in communication with a computer 1332, a pointing device 1335, a scanner 1331, or a networking device 1333 such as a switch or router, e.g., through a network adapter.

The computing device 1300 may be implemented in a number of different forms, as shown in the figure. For example, it may be implemented as a standard server 1320, or multiple times in a group of such servers. It may also be implemented as part of a rack server system 1324. In addition, it may be implemented in a personal computer such as a laptop computer 1322.

Alternatively, components from computing device 1300 may be combined with other components in a mobile device (not shown), such as device 1350. Each of such devices may contain one or more of computing device 1300, 1350, and an entire system may be made up of multiple computing devices 1300, 1350 communicating with each other.

Computing device 1350 includes a processor 1352, memory 1364, an input/output device such as a display 1354, a communication interface 1366, and a transceiver 1368, among other components. The device 1350 may also be provided with a storage device, such as a Microdrive, solid state memory or other device, to provide additional storage. Each of the components computing device 1350, processor 1352, memory 1364, display 1354, communication interface 1366, and transceiver 1368 are interconnected using various busses, and several of the components may be mounted on a common motherboard or in other manners as appropriate.

The processor 1352 can execute instructions within the computing device 1350, including instructions stored in the memory 1364. The processor may be implemented as a chipset of chips that include separate and multiple analog and digital processors. The processor may provide, for example, for coordination of the other components of the device 1350, such as control of user interfaces, applications run by device 1350, and wireless communication by device 1350.

Processor 1352 may communicate with a user through control interface 1358 and display interface 1356 coupled to a display 1354. The display 1354 may be, for example, a TFT LCD (Thin-Film-Transistor Liquid Crystal Display) or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may be provided in communication with processor 1352, so as to enable near area communication of device 1350 with other devices. External interface 1362 may provide, for example, for wired communication in some implementations, or for wireless communication in other implementations, and multiple interfaces may also be used.

The memory 1364 stores information within the computing device 1350. The memory 1364 can be implemented as one or more of a computer-readable medium or media, a volatile memory unit or units, or a non-volatile memory unit or units. Expansion memory 1374 may also be provided and connected to device 1350 through expansion interface 1372, which may include, for example, a SIMM (Single In Line Memory Module) card interface. Such expansion memory 1374 may provide extra storage space for device 1350 or may also store applications or other information for device 1350. Specifically, expansion memory 1374 may include instructions to carry out or supplement the processes described above and may include secure information also. Thus, for example, expansion memory 1374 may be provide as a security module for device 1350 and may be programmed with instructions that permit secure use of device 1350. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1364, expansion memory 1374, memory on processor 1352, or a propagated signal that may be received, for example, over transceiver 1368 or external interface 1362.

Device 1350 may communicate wirelessly through communication interface 1366, which may include digital signal processing circuitry where necessary. Communication interface 1366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1368. In addition, short-range communication may occur, such as using a Bluetooth, Wi-Fi, or other such transceiver (not shown). In addition, GPS (Global Positioning System) receiver module 1370 may provide additional navigation- and location-related wireless data to device 1350, which may be used as appropriate by applications running on device 1350.

Device 1350 may also communicate audibly using audio codec 1360, which may receive spoken information from a user and convert it to usable digital information. Audio codec 1360 may likewise generate audible sound for a user, such as through a speaker, e.g., in a handset of device 1350. Such sound may include sound from voice telephone calls, may include recorded sound (e.g., voice messages, music files, etc.) and may also include sound generated by applications operating on device 1350.

The computing device 1350 may be implemented in a number of different forms, as shown in the figure. For example, it may be implemented as a cellular telephone 1380. It may also be implemented as part of a smartphone 1382, personal digital assistant, a tablet computer 1383 or other similar mobile computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The present disclosure, in various embodiments, includes components, and apparatus substantially as depicted and described herein, including various embodiments, sub-combinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

REFERENCE NUMERALS

- 100, 200, 300 upper portion of the headset
- 101, 201, 401 bend and stay wires
- 102, 202, 402 chin electrode pair and IMU
- 103, 203, 403 neck electrode pair
- 104, 204, 302, 404 upper electrode pair
- 301 user's ear
- 500 the entire headset
- 501 hardware signal processing board
- 502 microcontroller
- 503 interface device
- 504 cloud computing platform
- 505, 604, 904 system output
- 600-603 basic use flowchart
- 700 EMG sensor neck input
- 701 EMG sensor chin input
- 702 IMU input
- 703 signal amplifier
- 704 noise filter
- 705 IMU onboard calculation
- 706, 800, 1100 EMG time window
- 707, 801 IMU time window
- 802, 1101, 1201 MFCC conversion
- 803, 1102, 1202 EMG vector representation
- 804 IMU vector representation
- 805, 900 aggregated vector representation
- 901 neural network
- 902 CTC function
- 903 language model
- 1000, 1200 example time window
- 1300-1383 computer devices

What is claimed is:

1. A sub-vocal speech recognition apparatus comprising:
   a chin electrode that is adapted to be placed on a chin of a user and produce chin electrical signals;
   a neck electrode that is adapted to be placed on a neck of the user and produce neck electrical signals;
   a chin Inertial Measurement Unit (IMU) adapted to be placed on a chin of the user and produce chin movement signals;
   a chin housing wherein the chin electrode and the chin IMU are mounted in the chin housing;
   a first bend and stay wire coupled between the headset and the chin housing;
   a second bend and stay wire coupled between the headset and the neck electrode;
   a processor that receives the chin electrical signals, the neck electrical signals, and the chin movement signals within a period of time, wherein the processor determines sequences of phonemes and convers the sequences of phonemes into a natural language output; and
   an output device that emits the natural language output.

2. The sub-vocal speech recognition apparatus of claim 1 further comprising:
   a plurality of signal amplifiers that amplify the chin electrical signals and the neck electrical signals, before the processor receives the chin electrical signals, the neck electrical signals.

3. The sub-vocal speech recognition apparatus of claim 1 further comprising:
   a signal smoother for smoothing the signals from the chin IMU.

4. The sub-vocal speech recognition apparatus of claim 1 further comprising:
   a plurality of noise filters that filter noise from the plurality of signals from the chin electrodes, the neck electrodes, and the chin IMU; and
   an ear electrode coupled to the plurality of noise filters wherein the ear electrode is adapted to contact a surface of the user and provides a ground reference signal.

5. The sub-vocal speech recognition apparatus of claim 1 further comprising:
   a headset adapted to be worn on an ear of the user;
   an ear electrode coupled to the headset wherein the ear electrode is adapted to contact a surface of the user and provides a ground reference signal.

6. The sub-vocal speech recognition apparatus of claim 1 wherein the output device is a speaker and the natural language output are audio signals.

7. The sub-vocal speech recognition apparatus of claim 1 wherein the output device is a visual display and the natural language output are text signals.

8. The sub-vocal speech recognition apparatus of claim 1 further comprising:
   an interface computing device that receives the chin electrical signals, the neck electrical signals, and the chin movement signals and transmits the chin electrical signals, the neck electrical signals, and the chin movement signals to a cloud based computing platform wherein the processor that determines sequences of phonemes and convers the sequences of phonemes into the natural language output is on the cloud based computing platform.

9. A sub-vocal speech recognition apparatus comprising:
   a chin electrode that is adapted to be placed on a chin of a user and produce chin electrical signals;
   a neck electrode that is adapted to be placed on a neck of the user and produce neck electrical signals;

a chin Inertial Measurement Unit (IMU) adapted to be placed on a chin of the user and produce chin movement signals;

a chin housing wherein the chin electrode and the chin IMU are mounted in the chin housing;

a first bend and stay wire coupled between the headset and the chin housing;

a second bend and stay wire coupled between the headset and the neck electrode;

a processor that receives the chin electrical signals, the neck electrical signals, and the chin movement signals within a period of time, wherein the processor converts the chin electrical signals, the neck electrical signals, and the chin position signals into vector representations;

a Mel Frequency Cepstral Coefficients (MFCC) conversion module running on the processor for processing time window blocks of data; and an output device that receives output signals from the processor.

10. The sub-vocal speech recognition apparatus of claim 9 further comprising:

an element vector representation module running on the processor for processing the time window blocks of data for the plurality of signals from the chin electrode and the neck electrode.

11. The sub-vocal speech recognition apparatus of claim 9 further comprising:

a position calculation module running on the processor for processing the time window blocks of data for the plurality of signals from the chin IMU.

12. The sub-vocal speech recognition apparatus of claim 11 further comprising:

a vector quantization and assignment module running on the processor producing multi-numeral vectors for the blocks of data from the element vector representation modules and the position calculation module.

13. The sub-vocal speech recognition apparatus of claim 9 further comprising:

a neural network running on the processor that determines the phonemes for the plurality of signals from the multi-numeral vectors.

14. The sub-vocal speech recognition apparatus of claim 9 further comprising:

a Connectionist Temporal Classification (CTC) loss function and language model running on the processor that adds context to the phonemes and determines the sequences of phonemes.

15. The sub-vocal speech recognition apparatus of claim 9 further comprising:

a headset adapted to be worn on an ear of the user;

an ear electrode coupled to the headset wherein the ear electrode is adapted to contact a surface of the user and provides a ground reference signal.

16. The sub-vocal speech recognition apparatus of claim 9 further comprising:

an interface computing device that receives the chin electrical signals, the neck electrical signals, and the chin movement signals and transmits the chin electrical signals, the neck electrical signals, and the chin movement signals to a cloud based computing platform wherein the processor that determines sequences of phonemes and converts the sequences of phonemes into the natural language output is on the cloud based computing platform.

* * * * *

UNITED STATES PATENT AND TRADEMARK OFFICE
CERTIFICATE OF CORRECTION

PATENT NO. : 10,621,973 B1  
APPLICATION NO. : 15/928065  
DATED : April 14, 2020  
INVENTOR(S) : Ryan McVicker and Brett Eigenbrode Page 1 of 1

It is certified that error appears in the above-identified patent and that said Letters Patent is hereby corrected as shown below:

On the Title Page

Under Assignee please delete "Vocasso, Inc., San Francisco, CA" and insert in place therefore
--Ryan McVicker, Los Gatos, CA--

Signed and Sealed this
Twenty-fourth Day of November, 2020

Andrei Iancu
*Director of the United States Patent and Trademark Office*